United States Patent
Zhakov

(10) Patent No.: US 10,462,304 B2
(45) Date of Patent: Oct. 29, 2019

(54) SERVICE CONTROL POINT FUNCTIONALITY IMPLEMENTED AT COMMUNICATION ENDPOINTS

(71) Applicant: GENESYS TELECOMMUNICATIONS LABORATORIES, INC., Daly City, CA (US)

(72) Inventor: Vyacheslav Zhakov, Burlingame, CA (US)

(*) Notice: Subject to any disclaimer, the term of this patent is extended or adjusted under 35 U.S.C. 154(b) by 0 days.

(21) Appl. No.: 15/853,064

(22) Filed: Dec. 22, 2017

(65) Prior Publication Data

US 2018/0115649 A1    Apr. 26, 2018

Related U.S. Application Data

(63) Continuation of application No. 14/477,779, filed on Sep. 4, 2014, now Pat. No. 9,854,103, which is a continuation of application No. 13/356,996, filed on Jan. 24, 2012, now Pat. No. 8,879,708.

(51) Int. Cl.
| | |
|---|---|
| *H04M 7/00* | (2006.01) |
| *H04M 15/08* | (2006.01) |
| *H04M 15/00* | (2006.01) |
| *H04M 3/51* | (2006.01) |

(52) U.S. Cl.
CPC ......... *H04M 7/0075* (2013.01); *H04M 15/08* (2013.01); *H04M 15/56* (2013.01); *H04M 15/8044* (2013.01); *H04M 3/5166* (2013.01); *H04M 2242/15* (2013.01)

(58) Field of Classification Search
CPC .. H04M 3/5232; H04M 3/5183; H04M 3/523; H04M 3/5175; H04M 3/5166; H04M 3/51; H04M 3/5158
USPC ............ 381/211.01, 211.02, 265.02, 265.01, 381/265.11, 266.09
See application file for complete search history.

(56) References Cited

U.S. PATENT DOCUMENTS

| | | | |
|---|---|---|---|
| 5,692,033 A | 11/1997 | Farris | |
| 6,385,312 B1 | 5/2002 | Shaffer et al. | |
| 7,386,103 B1 | 6/2008 | Chahal | |
| 7,515,695 B1* | 4/2009 | Chan ................ | H04M 3/493 379/221.09 |
| 8,009,822 B1 | 8/2011 | Boutcher et al. | |
| 8,064,354 B1 | 11/2011 | Barghouthi | |
| 8,085,912 B1 | 12/2011 | Beene et al. | |
| 8,879,708 B2 | 11/2014 | Zhakov | |

(Continued)

OTHER PUBLICATIONS

International Search Report and Written Opinion for International Application No. PCT/US13/23031, dated Mar. 7, 2013 and dated Apr. 9, 2013, 7 pages.

*Primary Examiner* — Alexander Jamal

(57) ABSTRACT

A system for managing customer-to-business voice communication has a network-connected communications device and instructions executable on the communications device from a non-transitory physical medium, the instructions providing a first function for determining if a destination asserted requires treatment, a second function for sending data from the communications device to a network-connected server, a third function for receiving alternative destination information from the server, and a fourth function for establishing communication with the business based on the returned destination information.

20 Claims, 4 Drawing Sheets

(56) References Cited

U.S. PATENT DOCUMENTS

| | | |
|---|---|---|
| 9,037,977 B1 | 5/2015 | Tovino et al. |
| 2002/0171581 A1 | 11/2002 | Sheynblat et al. |
| 2003/0007469 A1 | 1/2003 | Daley et al. |
| 2006/0126820 A1 | 6/2006 | Trandal et al. |
| 2007/0248103 A1 | 10/2007 | Delaney et al. |
| 2008/0198996 A1 | 8/2008 | Bantukul et al. |
| 2010/0029272 A1 | 2/2010 | McCann et al. |
| 2011/0153426 A1* | 6/2011 | Reddy .................... G06Q 30/02 705/14.58 |
| 2011/0237263 A1 | 9/2011 | Couse |
| 2012/0208526 A1* | 8/2012 | Fisher ................. H04M 3/2218 455/423 |
| 2013/0130666 A1 | 5/2013 | Dunko |

\* cited by examiner

SERVICE CONTROL POINT FUNCTIONALITY IMPLEMENTED AT COMMUNICATION ENDPOINTS

CROSS-REFERENCE TO RELATED DOCUMENTS APPLICATIONS

This application is a continuation of U.S. patent application Ser. No. 14/477,779, filed on Sep. 4, 2014, now U.S. Pat. No. 9,854,103, which is a continuation of U.S. patent application Ser. No. 13/356,996, filed on Jan. 24, 2012, now U.S. Pat. No. 8,879,708, the content of all of which are incorporated herein by reference.

BACKGROUND OF THE INVENTION

1. Field of the Invention

The present invention is in the field of telephony communication and pertains particularly to methods and apparatus for implementing service control point (SCP) functionality at communication endpoints.

2. Discussion of the State of the Art

In the field of telephony communications, businesses routinely employ multiple contact channels to facilitate consumer contact and direction toward the transaction process. A business may provide 1-800 numbers as well as one or more local telephone numbers for consumers to initiate voice contact with transaction services or technical service departments. Some businesses also provide access to transaction-based and technical services through Web-based services that require the consumer to navigate using a network-capable appliance.

One problem with static voice contact services is that cost for maintaining a connected voice channel may differ for consumers using mobile communications devices depending upon the location from which the communication attempt is initiated. In many instances, consumers do not have knowledge of all of the different voice contact numbers that may be provided for specific service regions. Moreover, consumers often overuse published 1-800 numbers when they could call a local number. Businesses must pay to maintain the 1-800 numbers and unnecessary use of those numbers by consumers can add up to higher business costs for communications. Providing Web-based transaction and technical service channels including VoIP channels and automated processes require more task processing for consumers relative to Website navigation and process initiation and qualification.

Therefore, what is clearly needed is a system and method for reducing cost of consumer access to business services in real time while reducing or eliminating navigation task problems associated with Web-based services as an alternative to initiating voice contact.

SUMMARY OF THE INVENTION

The problem stated above is that reduced cost is desirable for consumer-to-business voice communication, but many of the conventional means for reducing the costs to the consumer of such communication such as by providing alternate web-based business contact methods to avoid cost carrying channels also create more complexity in the consumer initiation process of the communication attempt. The inventors therefore considered functional components of a communication system and network, looking for elements that exhibit interoperability that could potentially be harnessed to provide lower cost consumer access to business communication channels but in a manner that would not create more work for the consumer.

Every business is propelled by consumer patronage, one by-product of which is a robust and loyal consumer base. Most such businesses employ contact services and Web-based services to direct potential consumers to a potential transaction, and Web servers and contact center services are typically a part of such apparatus.

The present inventor realized in an inventive moment that if, at the point of contact, potential costs to the consumer could be reduced for access to a voice communications channel maintained by the business, significant upswing in consumer loyalty and patronage might result.

The inventor therefore constructed a unique service for intervening in consumer contact attempts that allowed consumers to save on costs of connection while eliminating manual task performance related to navigating to a lower cost channel that can be used to initiate a transaction process with the business. A significant increase in completed transactions results, while automating priority channel access for the consumer.

Accordingly, in one embodiment a system for managing customer-to-business voice communication is provided, comprising a network-connected communications device and instructions executable on the communications device from a non-transitory physical medium. The instructions provide a first function for determining if a destination asserted requires treatment, a second function for sending data from the communications device to a network-connected server, a third function for receiving alternative destination information from the server; and a fourth function for establishing communication with the business based on the returned destination information.

In one embodiment the data comprises location information regarding the communications device. The location information may be derived from a Global Positioning System device operable at the communications device.

In one embodiment the treatment includes bumping the destination being dialed and immediately asserting a returned destination. The treatment may include pre-routing to a live or automated attendant or delivery of a callback request. VoIP destinations may include one or more person-to-person (P2P) destinations.

In another aspect of the invention a method for managing consumer-to-business voice communication is provided, comprising the steps of (a) at the time of a communication attempt initiated by a communications device, determining if a treatment should be applied to the communication destination; (b) if it is determined at step (a) that a treatment should be applied, passing data from the communications device to the server via a data connection; (c) based on the data received at the server, returning to the communications device one or more alternative communication destinations; and (d) substituting one of the returned destinations at the communications device for the destination originally asserted.

In one embodiment of the method the data comprises location information regarding the communications device. Also in one embodiment the location information is derived from a Global Positioning System device operable at the communications device. The treatment may include bumping the destination being dialed and immediately asserting a returned destination.

In some cases the treatment further includes pre-routing to a live or automated attendant, and also may include delivery of a callback request. Further, VoIP destinations may include one or more person-to-person (P2P) destinations.

BRIEF DESCRIPTION OF THE DRAWING FIGURES

DETAILED DESCRIPTION

The inventors provide a system and methods for reducing the costs of consumer-to-business communication that reduces or eliminates typical task requirements for consumers relative to navigating through lower cost communication channel alternatives. The present invention will be described in enabling detail using the following examples, which may describe more than one relevant embodiment falling within the scope of the present invention.

Figure 1:
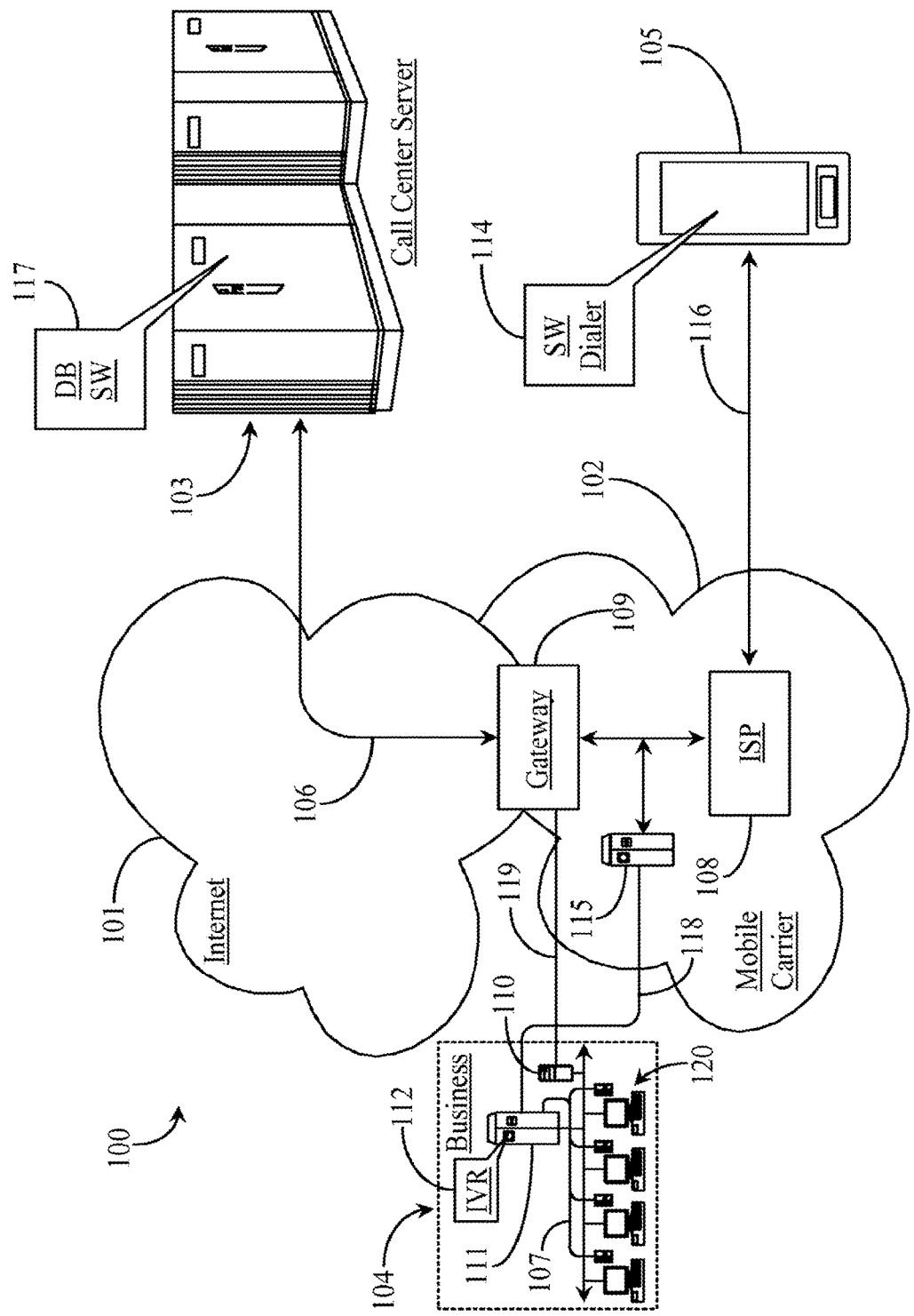
FIG. 1 is an architectural overview of a communications network supporting reducing costs in consumer-to-business communication according to an embodiment of the present invention.

FIG. 1 is an architectural overview of a communications network 100 supporting reducing costs in consumer-to-business communication according to an embodiment of the present invention. Communications network 100 includes The Internet network, illustrated herein as Internet network 101 and a mobile telephony carrier network 102, labeled mobile carrier. Mobile carrier network 102 may be any wireless carrier network having access to Internet network 101. Mobile network 102 may be a cellular telephony network, a wireless fidelity (WiFi) network or any other network capable of carrying voice communications for mobile clients. It should be noted herein that although it is preferred that network 102 is a wireless network, that fact should not be construed as a limitation of the present invention. In some embodiments, network 102 may be a wired telephone network.

Internet network 101 includes all of the lines, equipment, and access points that make up the Internet network as a whole including connected sub-networks. Therefore, there is no geographic limitation to the practice of the present invention. In one embodiment, network 101 may be a wireless network segment such as a municipal area network (MAN), or a corporate wide area network (WAN). Mobile carrier network 102 serves clients who operate a variety of mobile communications devices. One such potential consumer is represented herein by a mobile smart phone 105. Mobile phone 105 may instead be a cell phone, an android device, a personal digital assistant (PDA), or a computing appliance running a telephony application.

In this example, communications network 100 connects potential consumers to voice services offered by a business such as business 104. Business 104 may be any type of business offering products and or services to a consumer base. In a preferred embodiment, business 104 is a business with multiple regional locations, perhaps including multiple national and international locations. Business 104 represents just one of potential locations and includes a service center comprising multiple communications stations. Each communications station includes a local area network (LAN) connected computer and a telephone for voice communication. In a preferred embodiment, both telephones and computing stations are adapted for voice communications. Consumer 105 has wireless connection to network 102 via a wireless link 116. In this example, consumer operating mobile communications device 105 is connected to an Internet service provider (ISP) 108 enabling access to Internet network 101 through a multimedia gateway 109. Mobile phone 105 is also capable of receiving and making telephone voice calls through traditional networks such as the public switched telephone network and via Voice over Internet protocol (VoIP).

Business 104 includes a telephony switch 111 connected by a telephone trunk 118 to a local telephone switch 115 within mobile network 102. Switches 111 and 112 may be private branch exchange (PBX) switches, automated call distributors (ACD) switches, or some other type of service control point (SCP) capable of distributing telephone calls without departing from the spirit and scope of the present invention. The telephones at communications stations 120 have connection to switch 111 in this example, via internal telephone wiring 107. Switch 111 has access to an interactive voice response (IVR) application adapted to screen incoming calls and to provide routing and automated services to potential consumers. The LAN inside business 104 supports an Internet protocol router 110 adapted to receive and route VoIP requests to agents manning communications stations 120. In this sense, business 104 can handle multiple channels of communication including plain old telephony system (POTS) calls and Internet protocol network telephony (IPNT). The contact services performed by business 104 may instead be contracted out to a third party such as a contact center without departing from the spirit and scope of the present invention.

A third-party contact center server 103 is illustrated in this example and is adapted to be a service provider of the service of the present invention. The contact service infrastructure illustrated in business 104 may be hosted by a contact center that also hosts server 103. Server 103 includes a non-transitory physical medium containing all of the data and instructions required to enable function as a data server connected to the Internet. Server 103 has connection to Internet 101 via an Internet access line 106, and to mobile network 102 through gateway 109. Server 103 includes a database application that is adapted to receive, maintain, and serve data belonging to businesses that may subscribe to a third-party-hosted service of the present invention. In another embodiment, a business may acquire the capability of implementing the service internally for its sole use without departing from the spirit and scope of the invention.

In this embodiment, business 104 publishes specific voice contact data for all of its locations to contact center server 103. Such information is maintained for the business with the aid of instructions 117. Business 104 may have multiple local telephone numbers for each office or business department distributed over a region, the local numbers for use by potential consumers who are within local calling distance from a particular office or department. In addition, business 104 may also have special 1-800 toll-free telephone numbers for consumers who must reach a specific office or department, but that are currently outside of the local calling distance of that office or department.

A potential consumer may avoid long distance charges by calling the local number if the person is local to the business at the time of a call. If the potential consumer is not local, they may select an appropriate published 1-800 number to reach the business department or office of the business. 1-800 numbers include additional prefixes 888, 877, 866, and 855. Consumers incur costs of long distance numbers and some local numbers while businesses incur the costs for subscribing to 1-800 numbers and the cost of use by consumers using the numbers to avoid toll charges. Call center server 103 maintains all of a businesses' published (local) contact numbers as well as published 1-800 numbers. Server 103 may also maintain published VoIP telephone numbers and Skype numbers used by the business.

Smart telephone 105 has a dialer 114 residing on a non-transitory physical medium and executed to run in this example. Dialer 114 serves as a proxy-dialing engine for smart phone 105. Dialer 114 includes logic for establishing a channel to a URL-based Web service running on call center server 103. Dialer 114 may be downloaded from server 103 or from any Website operated by the entity providing the service of the present invention. In another embodiment, dialer 114 may be a temporary download instead of a resident application. When a consumer operating smart phone 105 attempts a call to a business, such as business 104, that subscribes to the service, dialer 114 determines, during or just before a call attempt, whether or not a lower cost number is available to replace the number selected by the consumer to dial. In a preferred embodiment, the service attempts to lower the cost of the connection for both the customer and the business. In another embodiment the service may also, or alternatively, determine a number or numbers based on load.

A simple example of use may involve a person attempting to dial a business number from a directory or from a list of contact numbers on the smart phone. When the customer is dialing a number the dialer proxy checks whether a treatment should be applied to the dialed number. In one embodiment, numbers that belong to subscriber businesses such as those that might be found in a local directory or contact list on the operators phone may be flagged for the instruction set to intervene. In one embodiment, dialer 114 may intervene any time a 1-800 number is selected for dialing. In one embodiment, the operator dials the initial 1-800 number and dialer 114 intervenes by sending current geographic positioning satellite (GPS) data along with the reference 1-800 number to server 103. At server 103, instructions 117 check the number and GPS information and determines if there is an available local number that the operator of smart phone could subsequently dial instead of the initial 1-800 number to establish a connection that could avoid the charges to the business for use of the 1-800 number.

In one embodiment, the proxy dialer (dialer 114) has already established a connection with server 103 before the operator of smart phone 105 selects a number to dial. In this case, dialing may be automatically delayed by inserting a pause of a specified time until the results of the number and GPS data analysis are performed at server 103. If a local number is available that routes the intended call to the correct or equally suitable office or department of the business, the local number is forwarded to dialing application (dialer) and is dialed instead of the 1-800 number saving cost for the business in this case. In another embodiment, dialing of the initial number is cancelled if the proxy dialer determines that a different telephone number should be used instead.

In another case, it may be that the operator of smart phone 105 has access to a local number for a subscribing business, but is outside the local dialing range at the time that the call is intended. In this case, dialer 114 passes the GPS data and local number selected to server 103. If the local number can be associated with a 1-800 number to the same location, the 1-800 number is forwarded to smart phone 105 and that number is immediately dialed saving the customer the cost of long distance dialing to the local number. Each subscribing business such as business 104 may have its own secure area in the database for publishing all of the contact information available for each office and department location.

Dialer 114 may be provided with special configuration files from server 103 at the time of inquiry about a number to be dialed. In this case, the configuration file may specify which number is best to dial based on GPS status. In one embodiment, dialer 114 may provide consumer identification data to server 103 along with the number and GPS information. In this case, server 103 may further contain customer information, or a redirection link to a customer database hosted by the targeted business. In this embodiment, there may be special configuration files for customers that could direct the calls in specific manners such as by skipping IVR treatment for certain customer groups or by ordering priority routing for specific customers identified as high priority patrons. Such a pre-configured file might be communicated with the subsequent call to provide special commands for the dialed endpoint relative to how this consumer should be treated. If the file is also forwarded to the business at the time download to smart phone 105 before the call attempt, the contact center has knowledge of the impending telephone call and routing instruction before the call is placed.

In one embodiment, server 103 may return more than one number to consider in dialing. For example, a 1-800 number may generally park the consumer at an IVR where intervention occurs before transfer to the appropriate destination within the business. The 1-800 number may cover two or more call destinations within a department or office. By returning all of the local numbers and service descriptions for those numbers covered by the 1-800 number, the consumer can call in direct and skip IVR treatment for internal routing. The consumer might view the number choices before selecting the appropriate local number to dial. In one embodiment, the numbers may be arranged in some order of priority so that the dialer simply dials the first number on the list. If the first number is not answered or the estimated waiting time for service is too high, the dialer might terminate the call and immediately dial the next local number on the list returned by server 105. The amount of consumer personalization available to the call is partly dependent on the amount and type of information maintained at server 103 and the type and amount of information sent to the server from the smart phone at the time of the initial call attempt.

In one embodiment, the consumer operating smart phone 105 may have a local business directory downloaded to the device or presented on a website accessed from the device. If dialer 114 is executed and running at the time of number browsing, the numbers viewed that belong to subscriber businesses may be caused to light up or present flags indicating which businesses participate in the service.

Figure 2:
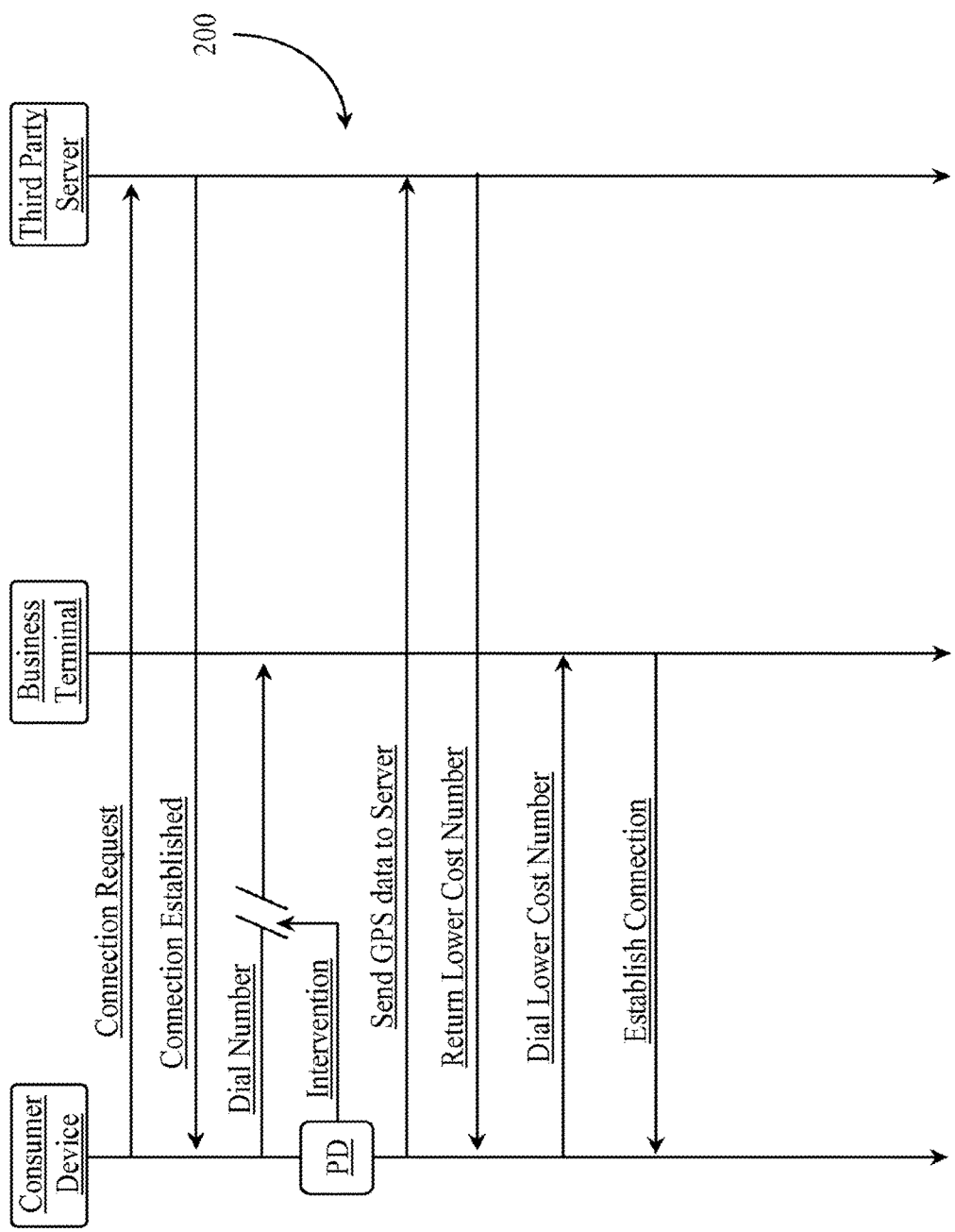
FIG. 2 is a sequence diagram illustrating steps for determining if a call attempt requires cost intervention according to the embodiment of FIG. 1.

FIG. 2 is a sequence diagram 200 illustrating steps for determining if a call attempt requires cost intervention according to the embodiment of FIG. 1. On the consumer device and at or before the time of a call attempt, a proxy dialer analogous to dialer 114 of FIG. 1 send a connection request to a third-party server to establish a an active session. In one embodiment, the server may be hosted by the business that the caller wishes to contact. The third-party server analogous to server 103 of FIG. 1 acknowledges the request and a session is established.

When the consumer desires to call a business, the consumer may select a number and simply place the call. With the proxy application running, the proxy dialer may automatically and by default, intervene in the call attempt. The call attempt may be paused or delayed or canceled during the intervention. The proxy dialer may gather GPS information and the original number dialed, and send the data to the third-party server. At the server, a lookup is performed to determine if the number belongs to a subscribing business. If the number does not belong to a subscribing business then the intervention may be terminated and the original number may be dialed. In one embodiment, the service does not require businesses to subscribe, but gathers the public contact information for all businesses and sells subscriptions to consumers instead.

If the GPS data and the number identification indicate that the consumer should call another telephone number, the lower cost number is returned to the consumer device for dialing. This number might be a local telephone number, a 1-800 number, or a VoIP number such as a Skype number. The proxy dialer on the consumer device dials the returned number to the business and establishes a voice call connection to the business. For each call attempt, the proxy dialer may intervene to determine if a lower cost number for the destination dialed is available. The cost savings may go to the business or the consumer depending on the scenario. In one instance where it is known the user has a Skype account or similar VoIP access account, the number returned may be a Skype number or other VoIP dialable address that might be a lower cost alternative than an originally dialed long distance number depending on a consumers communications contract with the telephony carrier.

Figure 3:
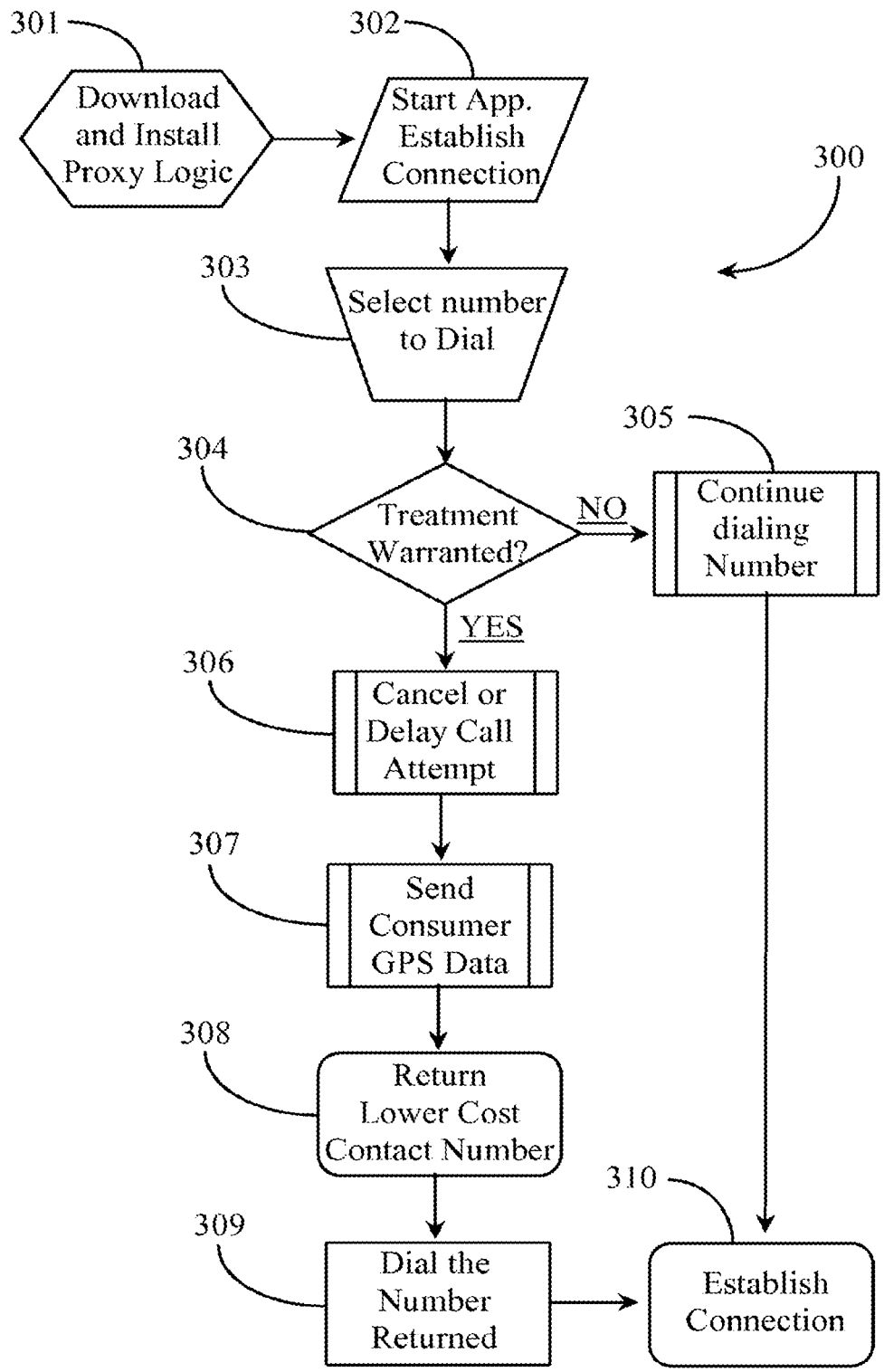
FIG. 3 is a process flow chart illustrating steps for intervening in a communication attempt to lower cost for a connection.

FIG. 3 is a process flow chart 300 illustrating steps for intervening in a communication attempt to lower cost for a connection. At step 301, the consumer might download and install a proxy telephone dialer and logic analogous to dialer 114 of FIG. 1. At step 302, the consumer may start the application and establish a connection with a third-party data server like server 103 of FIG. 1. At step 303, with the application running in the background, the consumer selects a number to dial. The number might be selected from a list on the phone or from a directory being accessed by the phone, or from a number returned during a 411 call.

At step 304, the proxy dialer intervenes to determine if a treatment is warranted for the number subject to dialing. In one embodiment, the number may be flagged for intervention based on GPS data that has changed during the course of the application running and movement of the consumer. In one embodiment, each number being dialed is checked against information held in a third-party server database. In still another embodiment, all of the subscribed business numbers are available to the phone in a special directory that may be presented in light of current GPS coordinates.

If at step 304, no treatment is warranted, the dialer continues dialing the original telephone number at step 305. The connection is established at step 310 skipping steps 306-309. This may mean that the number being dialed is a business subscriber's number and is already the best number to call based on the GPS coordinates, or that the number was not known to the system as a subscriber number. If the system determines that treatment is warranted at step 304, then the proxy dialer may delay the call attempt to the initial number at step 306 while a better number is being obtained.

In one embodiment, the number and the GPS location information is passed to the server for every dialing attempt and determination of treatment or no is made at the server.

At step 307, the proxy dialing application passes the consumer GPS information and the telephone number being dialed to the third-party server. At step 308, the server returns a lower cost contact number to dial for the given circumstances. The cost savings could go the consumer or to the business depending on the initial number dialed, the current GPS data and the number returned. At step 309, the proxy dialer dials the number returned by the server. The connection is established at step 310. In one embodiment, enough information is provided locally to determine if treatment should be applied and that determination may be made before GPS information is sent out to the server. In another embodiment, all determinations are made at the server based on information sent to the server by the proxy dialing application. In one embodiment, treatment may include personalized treatment for known consumers.

Figure 4:
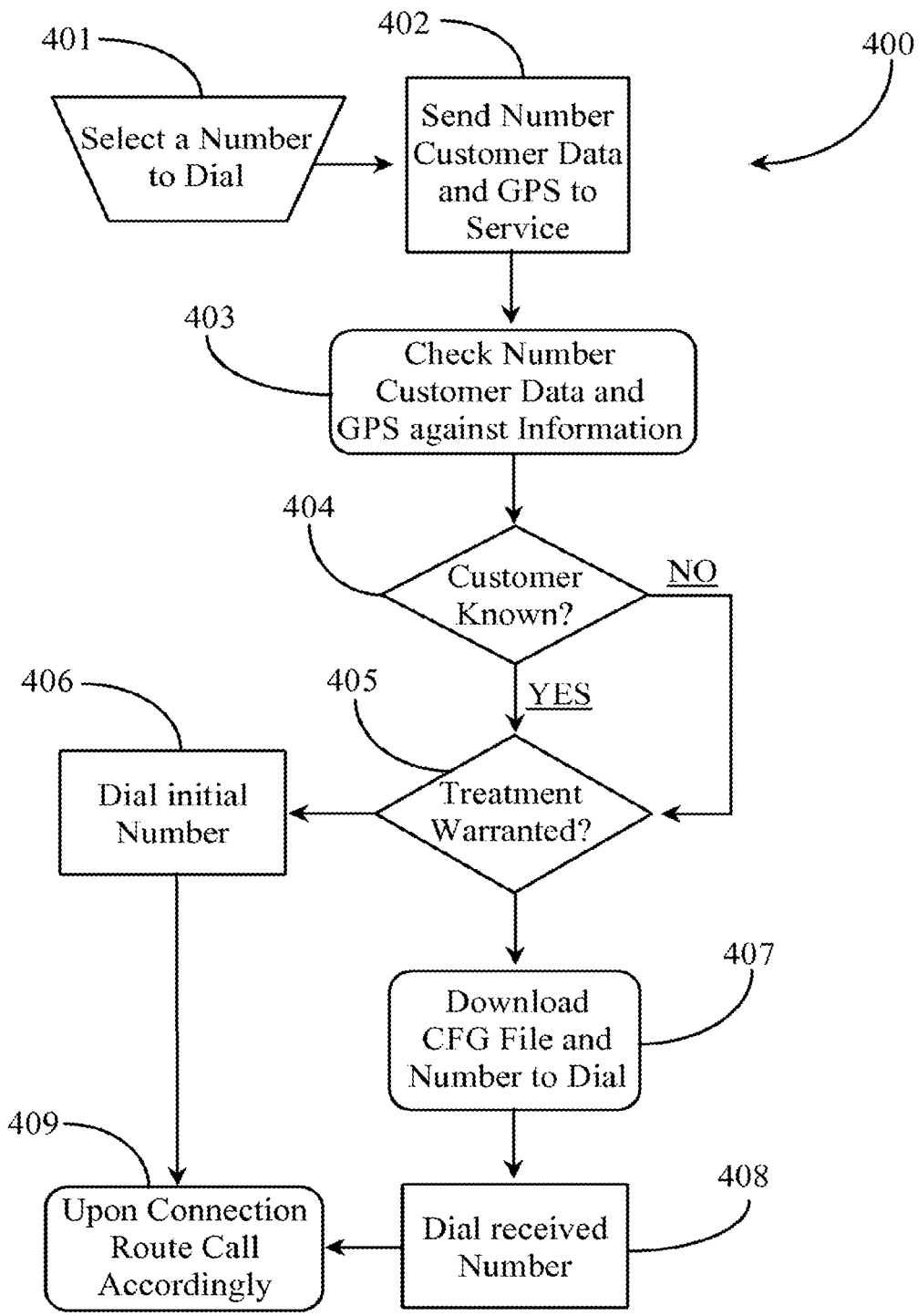
FIG. 4 is a process flow chart illustrating steps for reducing costs for a connection and applying personalized treatment according to an embodiment of the present invention.

FIG. 4 is a process flow chart 400 illustrating steps for reducing costs for a connection and applying personalized treatment according to an embodiment of the present invention. This process assumes that the consumer has the proxy dialing application running in the background with a connection established with a third-party server analogous to server 103 of FIG. 1.

At step 401, the consumer selects a number to dial. At step 402, the instructions send the number, customer data, and GPS data to the service hosted on the server. In this case, the service may provide secure database areas for customer service data provided to the server by businesses. The customer data sent from the communications device might be limited to the customer's name and telephone number. At step 403, the service checks the number originally dialed against the numbers listed at the service to determine if the number belongs to a subscribing business. If it does not, the original number dial attempt may be resumed and customer data and GPS information may be purged from the server.

At step 404, the service may determine if the customer is known to the business that the customer is attempting to dial. This can be determined if the subscribing business has provided customer identification of regular or repeat consumers to the server. Whether the customer is known or not known may play into which type of treatment may be applied. At step 405, the service determines if a treatment is warranted. This determination may be made based on number identification, customer identification and GPS location information at the time of the call attempt.

If the service determines that treatment is not warranted at step 405, the process moves to step 406 and the dialer resumes dialing the initial number. The determination that treatment is not warranted may be made according to information that the dialed number has no lower cost alternative or the business number dialed is not known. At step 409, the call is connected and routed accordingly without any special treatment.

At step 405, if the service determines that treatment is warranted, it will mean that the business tied to the initial number is a subscribing business, that there is a lower cost alternative number the consumer could dial instead, and perhaps the status of the customer as known to the business owning the number dialed. In this case, the service may send a CFG file and lower cost number to dial to the communications device of the consumer at step 407. The CFG file might contain certain routing information that could be passed to the business during the subsequent telephone call using the lower cost number. The CFG file might be tailored according to customer type or segmentation, or value to the business.

At step 408, the proxy dialer dials the returned telephone number. At step 409, the business answers the call and it is routed accordingly. For example, if the CFG file has code that suggests direct connection to a live agent rather that IVR treatment that could be communicated immediately if the IVR answers. The IVR would immediately transfer the caller to the best or directed destination. In one embodiment, the business is copied on the treatment as it is forwarded to the consumer's communications device. In that case, the business will have pre-knowledge of the impending call and can initiate routing before the call hits the system. Other components could be included in treatment such as building in a call back request, skipping IVR processing, immediate live agent transfer, auto attendant transfer, transfer to billing, transfer to service or help, among others.

It will be apparent to one with skill in the art that the communications cost reduction system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for establishing voice communication between a communications device and a contact center, the system comprising:
    a processor of the communications device; and
    a memory of the communications device, wherein the memory stores instructions that, when executed by the processor, cause the processor to:
        identify a first number of a destination to be dialed;
        determine that the first number satisfies a particular criteria;
        in response to determining that the first number satisfies the particular criteria, automatically transmit a request to a server over a data link, the request including geographic location information of the communications device, wherein in response to the request, the server is configured to:
            lookup the first number and identify a related second number;
            determine, based on the geographic location of the communications device, whether the identified second number is within a local dialing range of the destination; and
            in response to determining that the identified second number is within the local dialing range, return the identified second number;
        receive the identified second number from the server; and
        initiate a voice call to the second number instead of the first number.

2. The system of claim 1, wherein the first number satisfies the particular criteria when the first number is a toll number.

3. The system of claim 2, wherein the second number is a number other than the toll number.

4. The system of claim 1, wherein the request includes customer profile data and the second number is selected based on the customer profile data.

5. The system of claim 1, wherein the request includes customer profile data, and treatment of the voice call by the contact center is based on the customer profile data.

6. The system of claim 5, wherein the treatment includes by-passing an automated voice response system based on the customer profile data.

7. The system of claim 1, wherein the system is a mobile telephony device.

8. The system of claim 1, wherein the instructions further cause the processor to at least pause, delay, or cancel a communication attempt to the first number in response to determining that the first number satisfies the particular criteria.

9. The system of claim 1, wherein the instructions further cause the processor to:
    receive a third number from the server along with the second number;
    display the second and third numbers; and
    receive selection of the second number for initiating the voice call to the second number.

10. The system of claim 9, wherein the instructions further cause the processor to:
    automatically initiate a voice call to the third number in response to lack of answer to the voice call to the second number.

11. A method for establishing voice communication between a communications device and a contact center, the method comprising:
    identifying, by the communications device, a first number of a destination to be dialed;
    determining, by the communications device, that the first number satisfies a particular criteria;
    in response to determining that the first number satisfies the particular criteria, automatically transmitting, by the communications device, a request to a server over a data link, the request including geographic location information of the communications device, wherein in response to the request, the server is configured to:
        lookup the first number and identify a related second number;
        determine, based on the geographic location of the communications device, whether the identified second number is within a local dialing range of the destination; and
        in response to determining that the identified second number is within the local dialing range, return the identified second number;
    receiving, by the communications device, the identified second number from the server; and
    initiating, by the communications device, a voice call to the second number instead of the first number.

12. The method of claim 11, wherein the first number satisfies the particular criteria when the first number is a toll number.

13. The method of claim 12, wherein the second number is a number other than the toll number.

14. The method of claim 11, wherein the request includes customer profile data and the second number is selected based on the customer profile data.

15. The method of claim 11, wherein the request includes customer profile data, and treatment of the voice call by the contact center is based on the customer profile data.

16. The method of claim 11, wherein the treatment includes by-passing an automated voice response system based on the customer profile data.

17. The method of claim 11, wherein the system is a mobile telephony device.

18. The method of claim 11 further comprising:
pausing, delaying, or canceling a voice call to the first number in response to determining that the first number satisfies the particular criteria.
19. The method of claim 11, further comprising:
receiving a third number from the server along with the second number;
displaying the second and third numbers; and
receiving selection of the second number for initiating the voice call to the second number.
20. The method of claim 19 further comprising:
automatically initiating a voice call to the third number in response to lack of answer to the voice call to the second number.

\* \* \* \* \*